United States Patent [19]

Johansson

[11] 4,060,366

[45] Nov. 29, 1977

[54] TUBE PERFORATOR

[76] Inventor: Sven Olof G. Johansson, 123 Winkler, Apt. 101, Houston, Tex. 77087

[21] Appl. No.: 737,498

[22] Filed: Nov. 1, 1976

[51] Int. Cl.² .......................... B26F 1/14; B29C 17/14

[52] U.S. Cl. .................................... 425/290; 425/299; 83/54; 83/586; 83/620; 83/628; 83/660

[58] Field of Search .................... 425/290, 299; 83/54, 83/586, 628, 660, 620

[56] References Cited

U.S. PATENT DOCUMENTS

| | | | |
|---|---|---|---|
| 1,650,682 | 11/1977 | Alltimes | 425/299 |
| 2,200,270 | 5/1940 | Flores | 425/299 |
| 2,589,908 | 3/1957 | Weidenmiller | 425/299 |
| 3,404,594 | 10/1968 | Dollenwayer | 83/660 |
| 3,971,275 | 7/1976 | Mach | 83/54 X |

*Primary Examiner*—Robert L. Spicer, Jr.
*Attorney, Agent, or Firm*—Ranseler O. Wyatt

[57] ABSTRACT

A tube perforating device for forming outlet openings in a tube, such as a plastic tube, having discharge openings for passage of air, or the like, where it is desired to diminish the sound of the discharge to a minimum, and the method of accomplishing such opening formations by multiple perforations with perforating members spaced as desired and having ovoid heads to permit perforations of the walls of the tube and withdrawing the head of the perforating means through the perforations, drawing the peripheral margins of the opening outwardly, leaving the inside wall of the tube smooth, thus diminishing turbulance therein, and said device having an adjustment permitting a selective penetration of both walls of the tubing, transversely, with just the point of the penetrating means perforating the bottom wall, forcing said peripheral margin outwardly on the bottom perforation, and withdrawing the said head through the upper wall penetration, again moving the peripheral margin outwardly, providing pairs of openings without adding restrictions in the inside of the tubing and thus maintaining the discharge at a minimum of sound.

5 Claims, 4 Drawing Figures

TUBE PERFORATOR

SUMMARY OF THE INVENTION

In hoods, such as are employed by sand blasters and painters in confined quarters, such as the inside of a storage tank, cool air is supplied to the inside of the hood during the work, so that the user will be provided with clean air, a cooling agent, and the shield of the hood will be free of condensation. This is customarily accomplished by introducing cool air into the hood through a perforated hose. Because the discharge openings are so close to the ears of the user, the sound of air passing through these openings can be very annoying to the hood user. To allow the free, silent passage of air from the hose into the hood, the inside wall of the hose is maintained smooth, with the lips of the opening drawn outwardly. The device described herein forms such openings, providing a base member having a groove to receive the hose to be perforated, and an upper member secured to the base member and constantly urged away from the base member, with a lever operated eccentric means adapted to move against the upper member to force same against the lower member. The upper member has a plurality of needles vertically adjustable in the upper member and extending downwardly beneath the upper member, the extended ends of said needles having a rounded head, substantially ovoid in shape terminating in a sharp point positioned to penetrate a hose resting on the base member, and forcing the head of the needle through one wall of the hose, and, if desired, the point of the needle also passing through the opposing wall of the hose, and the needle then withdrawn, the ovoid head of the needle drawing the peripheral edges of each opening so formed outwardly, leaving the inside wall of the hose smooth.

DESCRIPTION OF THE PREFERRED EMBODIMENT

Figure 1:
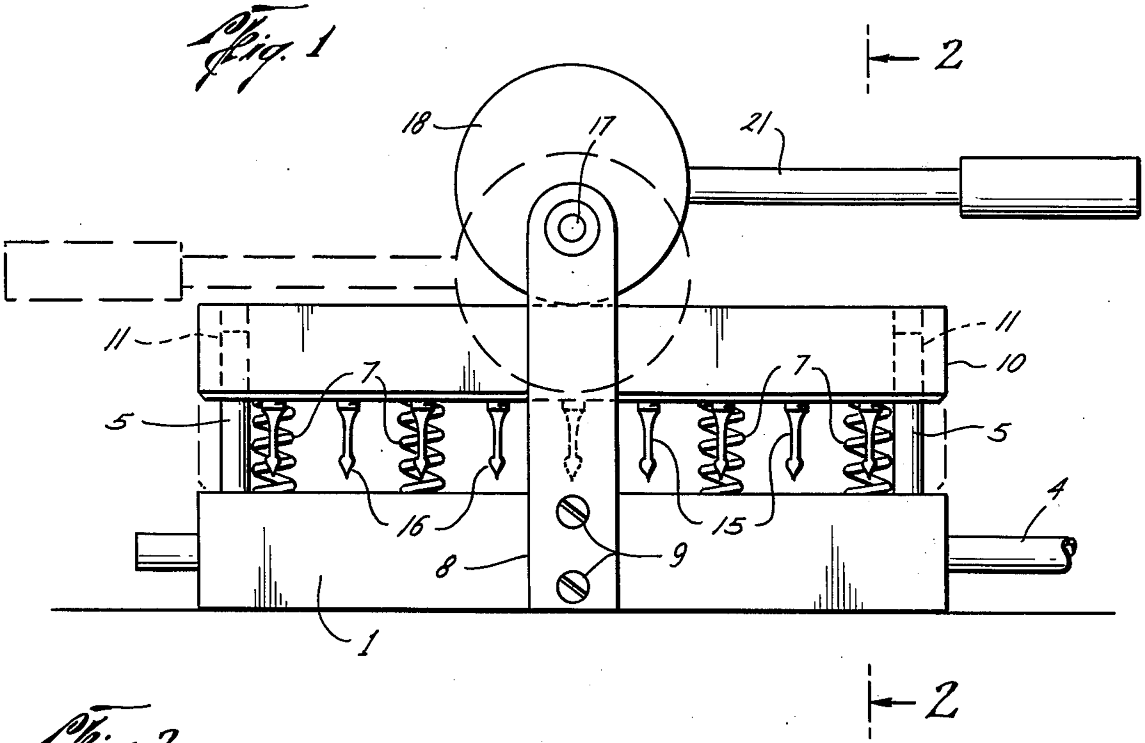
FIG. 1 is a front elevational view of the device, with a tube to be perforated mounted therein.
Figure 2:
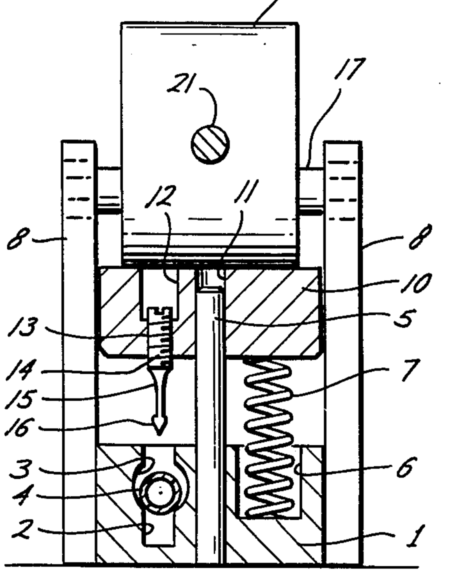
FIG. 2 is a cross sectional side elevational view, taken on the line 2—2 of FIG. 1, showing the upper member in raised position, with a tube mounted in the lower member, illustrating the first position of the perforating operation.
Figure 3:
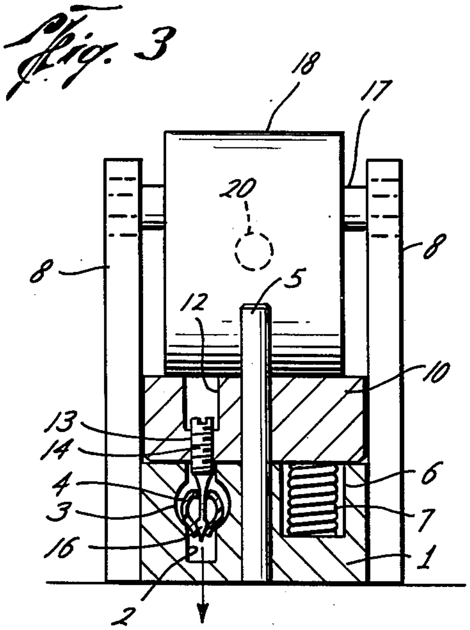
FIG. 3 is a cross sectional side elevational view, taken on the same line as FIG. 2, with the upper member in lowered position, illustrating the second position of the perforating operation.
Figure 4:
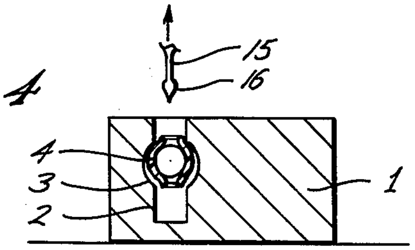
FIG. 4 is a fragmentary cross sectional side elevational view illustrating the third position of the perforating operation.

In the drawings, the numeral 1 designates a lower member formed of a rigid material, such as steel, and of a rectangular shape, in which a groove 2 is formed, which said groove extends longitudinally of the member 1, and whose side walls are vertical with an enlarged semi-circular area 3 midway between the vertical ends of said groove, adapted to receive a tube to be perforated, as 4. Pins 5, 5 are mounted in the lower member 1, and extend upwardly from the top surface of the lower member. Spring mounting chambers 6, 6 are formed in the base 1, to receive the springs 7, 7 which seat in said chambers and extend upwardly beyond the top surface of the lower member.

A pair of upstanding support members 8, 8 are secured to the lower member 1 as by the bolts 9, 9. An upper member 10, rectangular in shape and similar in dimensions to the lower member 1, is provided with ports 11, 11 formed therein and positioned to receive the guide pins 5, 5. A row of ports extends longitudinally of the upper member 10 and each port extends vertically through the upper member, the upper portion 12 of said ports being enlarged and the lower portion 13 being threaded. A needle 15 has its upper portion enlarged and threaded as 14 and may be mounted in said threaded portion 13 of the port. The upper end of the needle 15 is shaped to receive an Allen wrench for adjusting the needle, and the lower end of the needle has an ovoid head, as 16, terminating in a sharp point.

A shaft 17 is transversely mounted in the upper ends of said supporting members 8, 8, and the eccentric cam 18 is pivotally mounted on said shaft 17. A threaded port 20, in the face of said cam 18, receives the externally threaded handle 21.

The hose to be perforated is mounted in the groove 3, in the enlarged side wall area, and the needles 15 are adjusted in the ports 12 to the position desired. If only a single wall perforation is desired, the needles will be positioned to penetrate only that distance. The row of ports 12 will consist of a plurality of ports in close proximity to each other, and so many of the ports as may be desired, may be may be employed. Usually the needles are spaced to provide pairs of perforations in close proximity. If a double perforation is desired, the needles may be adjusted in the ports 12 to penetrate both walls upon termination of the down stroke. As the lower penetration is made, the margins of the perforations will be forced outwardly, the area of the groove beneath the enlarged area receiving the point of the needle, and as the needle is withdrawn, the rounded head of the needle will similarly draw the material around the margin of each perforation outwardly, leaving the inside wall of the tube without projections. The springs 7 urge the upper member 10 constantly into raised position, and the penetration is accomplished by rotating the cam against the top surface of the upper member, forcing the upper member downwardly, and the downward movement being limited by the lower member.

It is obvious that many types of tube perforations may be accomplished by this device, and that the manual means of lowering and raising the penetrating means may be replaced with electronic means, if desired.

The method taught herein is in the formation of perforations in tubes, and the like, by penetrating the side walls of the tube to be perforated, and in removing the needle from the tube, withdrawing the peripheral margins of the perforations, permitting the excess material to protrude outwardly, leaving the interior wall of the tube smooth.

What I claim is:

1. In a tube perforating device for forming perforations having outwardly extending margins, a lower member forming a base, said base having a groove in which a tube to be perforated may be mounted, said upper member being maintained yieldably above said base and movable downwardly against the base, needles adjustably mounted in said upper member, the extended ends thereof having an ovoid enlargement adjacent the point adapted to be forced through the first contacted wall of the tube, and perforate the second contact with the wall of the tube, forming diametrically opposed perforations.

2. The device defined in claim 1 wherein said base member tube-receiving groove has a semi-circular enlarged area midway between the vertical margins thereof to receive the tube to be perforated.

3. The device defined in claim 1 wherein means are provided for selectively penetrating both walls of a tube, and said upper member has a row of vertical ports in which said needles are mounted, said ports having their lower side walls reduced in diameter and threaded and the upper portion of said needles being threaded to be received by said threaded area of said ports, and selectively positioned for the length of stroke desired.

4. The device defined by claim 1 wherein said needles have a wrench receiving means in the upper ends thereof to permit positioning of said needles for depth of penetration and selection of the number of penetrations by each needle.

5. The device defined in claim 1 wherein said means for moving said upper member downwardly against the base consists of a pair of supporting members bracketing said base and anchored thereto, a transverse shaft extending through the upper ends of said supporting members and a cam eccentrically mounted on said shaft and bearing against said upper member and a handle mounted on said cam for manual rotation thereof.

* * * * *